US010064427B2

(12) United States Patent
Sikora (10) Patent No.: US 10,064,427 B2
(45) Date of Patent: Sep. 4, 2018

(54) SYSTEM AND METHOD FOR TRANSFERRING ROD-SHAPED ARTICLES AND ARRANGEMENT AND METHOD FOR RETAINING ROD-SHAPED ARTICLES IN A CONVEYOR BAND

(71) Applicant: PHILIP MORRIS PRODUCTS S.A., Neuchatel (CH)

(72) Inventor: Leszek Sikora, Radom (PL)

(73) Assignee: Philip Morris Products S.A., Neuchatel (CH)

( * ) Notice: Subject to any disclaimer, the term of this patent is extended or adjusted under 35 U.S.C. 154(b) by 0 days.

(21) Appl. No.: 15/029,845

(22) PCT Filed: Nov. 3, 2014

(86) PCT No.: PCT/EP2014/073510
§ 371 (c)(1),
(2) Date: Apr. 15, 2016

(87) PCT Pub. No.: WO2015/063284
PCT Pub. Date: May 7, 2015

(65) Prior Publication Data
US 2016/0235111 A1 Aug. 18, 2016

(30) Foreign Application Priority Data

Nov. 4, 2013 (EP) .................... 13191470

(51) Int. Cl.
*A24C 5/35* (2006.01)
*A24C 5/47* (2006.01)
(Continued)

(52) U.S. Cl.
CPC ............ *A24C 5/478* (2013.01); *A24C 5/35* (2013.01); *B65G 15/12* (2013.01); *B65G 15/16* (2013.01);
(Continued)

(58) Field of Classification Search
CPC ........ B65G 2201/0226; B65G 47/5122; A24C 5/35
(Continued)

(56) References Cited

U.S. PATENT DOCUMENTS 4,350,242 A * 9/1982 Hinchcliffe ............. A24C 5/35
198/605
5,255,777 A 10/1993 Pawelko
(Continued)

FOREIGN PATENT DOCUMENTS

CN  1071818  5/1993
CN  1093673  10/1994
(Continued)

OTHER PUBLICATIONS

PCT Search Report and Written Opinion for PCT/EP2014/073510 dated Jul. 13, 2015 (12 pages).

*Primary Examiner* — Gene O Crawford
*Assistant Examiner* — Lester Rushin
(74) *Attorney, Agent, or Firm* — Mueting, Raasch & Gebhardt, P.A.

(57) ABSTRACT

The system for transferring rod-shaped articles comprises a reservoir for holding a plurality of rod-shaped articles and a conveyor band comprising a seat adapted to receive a rod-shaped article from the reservoir. The system further comprises a speed compensator for compensating a speed variation of a portion of the conveyor band such that a speed of another portion of the conveyor band is kept constant. There is also provided an arrangement for retaining rod-shaped articles in a conveyor band. The arrangement comprises a conveyor wheel, wherein the seat is guidable in the conveyor band around the conveyor wheel and comprises an offset conveyor band arranged in parallel and at a distance to the conveyor band along a section of the conveyor band.

20 Claims, 2 Drawing Sheets (51) Int. Cl.
   *B65G 15/12* (2006.01)
   *B65G 15/16* (2006.01)
   *B65G 15/44* (2006.01)

(52) U.S. Cl.
   CPC ...... *B65G 15/44* (2013.01); *B65G 2201/0226* (2013.01); *B65G 2811/095* (2013.01)

(58) Field of Classification Search
   USPC ............... 198/347.1, 418.6, 460.2, 588, 594
   See application file for complete search history.

(56) References Cited

U.S. PATENT DOCUMENTS

| | | | |
|---|---|---|---|
| 5,577,594 A * | 11/1996 | Belvederi | A24C 5/35 |
| | | | 198/347.3 |
| 5,730,159 A | 3/1998 | Draghetti | |
| 5,803,702 A * | 9/1998 | Mullins | B65G 47/514 |
| | | | 198/454 |
| 5,878,865 A | 3/1999 | Bailey | |
| 6,269,931 B1 * | 8/2001 | Tale' | B65B 19/10 |
| | | | 198/418.3 |
| 6,642,380 B1 | 11/2003 | Kimura | |
| 6,725,997 B2 | 4/2004 | Draghetti | |
| 6,793,062 B2 | 9/2004 | Hammock | |
| 6,913,135 B2 * | 7/2005 | Borderi | B65G 47/082 |
| | | | 198/418.7 |
| 7,011,203 B2 | 3/2006 | Spatafora | |
| 7,163,098 B2 | 1/2007 | Ferrari | |
| 7,341,141 B2 | 3/2008 | Spatafora | |
| 2005/0092579 A1 * | 5/2005 | Spatafora | B65G 47/5122 |
| | | | 198/347.1 |
| 2015/0101621 A1 * | 4/2015 | Kramek | A24C 5/36 |
| | | | 131/281 |

FOREIGN PATENT DOCUMENTS

| | | |
|---|---|---|
| CN | 1140979 | 1/1997 |
| CN | 1157699 | 8/1997 |
| CN | 1396101 | 2/2003 |
| CN | 1112139 | 6/2003 |
| CN | 1444881 | 10/2003 |
| CN | 1503636 | 6/2004 |
| CN | 1608959 | 4/2005 |
| CN | 1611428 | 5/2005 |
| CN | 1659986 | 8/2005 |
| CN | 200976824 | 11/2007 |
| CN | 101119651 | 6/2010 |
| CN | 1291082 | 4/2011 |
| DE | 1066118 | 9/1959 |
| DE | 2618905 | 1/1980 |
| DE | 202004020681 | 12/2005 |
| EP | 0581143 | 9/1997 |
| EP | 1238910 | 9/2002 |
| EP | 1388507 | 3/2006 |
| EP | 1721844 | 11/2006 |
| EP | 1862410 | 12/2007 |
| GB | 190002975 A * | 2/1901 |
| GB | 1497221 | 1/1978 |
| JP | 2004-180605 | 7/2004 |
| WO | WO 95/21549 | 8/1995 |
| WO | WO 99/44446 | 9/1999 |
| WO | WO 2006/087188 | 8/2006 |

* cited by examiner

SYSTEM AND METHOD FOR TRANSFERRING ROD-SHAPED ARTICLES AND ARRANGEMENT AND METHOD FOR RETAINING ROD-SHAPED ARTICLES IN A CONVEYOR BAND

This application is a U.S. National Stage Application of International Application No. PCT/EP2014/073510, filed Nov. 3, 2014, which was published in English on May 7, 2015 as International Patent Publication WO 2015/063284 A2. International Application No. PCT/EP2014/073510 claims priority to European Application No. 13191470.7 filed Nov. 4, 2013.

The invention relates to a system and method for transferring rod-shaped articles. More particularly, the invention relates to a system and method for transferring rod-shaped articles for use in the production of smoking articles. The invention also relates to an arrangement and method for retaining rod-shaped articles in a conveyor band preferably for use in a system for transferring rod-shaped articles.

In the manufacture of smoking articles, individual rod-shaped articles such as filter segments or tobacco rods need to be transferred. In order to provide a continuous supply of tobacco rods and to transport the rods individually continuous belts for a transfer of the tobacco rods are used. A transfer of tobacco rods using conveyor belts requires a careful handling in order not to harm the rods.

Therefore, there is a need for a system and method that enables a reliable transfer of rod-shaped articles, especially which enables a reliable transfer of rod-shaped articles from a reservoir onto a conveyor band and subsequently to a receiving conveyor. There is also need for an arrangement and method for retaining rod-shaped articles in a conveyor band.

According to a first aspect of the present invention, there is provided a system for transferring rod-shaped articles. The system comprises a reservoir for holding a plurality of rod-shaped articles and a conveyor band comprising a seat adapted to receive a rod-shaped article from the reservoir. The system further comprises a speed compensator for compensating a speed variation of a portion of the conveyor band such that a speed of another portion of the conveyor band is kept constant. Preferably, the system also comprises a receiving conveyor adapted to receive a rod-shaped article from the conveyor band. Preferably, at a transfer location where rod-shaped articles are transferred from the conveyor band to the receiving conveyor, the speed of the conveyor band is kept constant. This facilitates a smooth and continuous transfer of rod-shaped articles, which may be favorable for any process or manufacturing steps that might follow a receiving conveyor.

Providing a conveyor band where rod-shaped articles are transferred to, released from, as well as transported with, bears many advantages. For example, a path that a rod-shaped article is to be transported along may easily be adapted in form and length by extending the length of the conveyor band. A conveyor band may also be manufactured from light materials and may provide a certain flexibility. The latter is especially favorable when the conveyor band shall be arranged in bends, for example around conveyor wheels. In addition, a certain flexibility is favorable when transporting delicate rod-shaped articles such as for example brittle or easily deformable rod-shaped articles.

A seat arranged in the conveyor band for receiving a rod-shaped article provides a hold and alignment of the rod-shaped article in the conveyor band and may for example be a groove or a flute arranged in the conveyor band.

The provision of a speed compensator allows to compensate a speed variation of a portion of the conveyor band. For example, a portion of the conveyor band may be accelerated or slowed down while keeping another portion of the conveyor band at a constant speed. This is especially favorable, if certain process steps require more or less time than other process steps. For example, a transferring of rod-shaped articles to or from the conveyor band may require a constant speed or a stopping of the conveyor band. Also a manipulation step while the rod-shaped article is in the conveyor band may require a different speed than an average moving speed of the conveyor band. Preferably, the conveyor band is stopped for a transfer of a rod-shaped article from the reservoir into a seat provided in the conveyor band. This facilitates a safe and precise transfer of the rod-shaped article from the reservoir into the seat. A misalignment, losing of the rod-shaped article by misplacement or a damaging of the rod-shaped article upon transfer may be reduced or even prevented. Preferably, the release of the rod-shaped article from the conveyor band is performed at a constant speed. The constant speed may facilitate the transfer of the transported rod-shaped articled for example onto a receiving conveyor for example in the form of a receiving wheel. By this, a rotational speed of the receiving wheel may be kept constant. If the receiving conveyor is additionally used for supplying the rod-shaped article to another manufacturing process requiring constant speed, the speed compensation allows for compensating speed variations directly during the transfer of the rod-shaped article on the conveyor band. Process steps preferably being performed at a constant speed may be common process steps in the manufacture of smoking articles, such as for example a cutting process, a wrapping process or a supply of additives to the rod-shaped article. Therein, additives may for example be particulate material, further rod-shaped or other formed segments to be aligned with the rod-shaped article.

According to an aspect of the system according to the invention, the system further comprises a pusher device. The reservoir is arranged adjacent a length side of the conveyor band and the seat is arranged in the conveyor band such that a rod-shaped article is pushable from the reservoir into the seat of the conveyor band by the pusher device. Preferably, a pushing direction is substantially perpendicular to a moving direction of the conveyor band thus performing a sideway pushing when seen in the moving direction of the conveyor band.

A transfer of a rod-shaped article onto the conveyor band from a side of the conveyor band instead as for example from an upper side of the conveyor band, may especially be favorable when transferring misbalanced rod-shaped articles. Misbalanced rod-shaped articles vary in weight along a length of the rod-shaped article. By this, gravitational force acts stronger onto a heavier end of the rod-shaped article which might lead to bending of the rod-shaped article, to a misalignment of the rod-shaped article in the conveyor band of even to its loss. Therefore, the controlled pushing of the rod-shaped article, preferably a sideway pushing, for the transfer of the rod-shaped article into its seat, the system according to the invention is not only suitable for example conventional smoking articles or other known more or less homogeneous rod-shaped articles. The system may also be used for transferring new generation products in the smoking article industry, such as smoking articles including combustible heat sources or heatable tobacco substrates or a combination thereof. These new generation products often are shorter that conventional smoking articles and misbalanced in weight due to a heavy heat source and other dense segments, such as a tobacco plug.

According to another aspect of the system according to the invention, the reservoir further comprises a channel adapted to hold a single file of rod-shaped articles arranged above each other in the channel. The lowest rod-shaped article of the single file in the channel, that is the one rod-shaped article arranged at the outlet of the channel, may then be pushed out of the channel and into the seat of the conveyor band by the pusher device. Preferably, the reservoir is arranged next to the length side of the conveyor band such that the lowest rod-shaped article may be pushed into the seat substantially with a liner movement, preferably in a horizontal direction. Preferably, the seat in the conveyor band and the channel of the reservoir are aligned in a same axis for the transfer of the rod-shaped article into the seat in the conveyor band.

In some preferred embodiments the reservoir comprises a plurality of channels, preferably arranged equidistantly, parallel to each other or both, wherein each of the channels is adapted to hold a single file of rod-shaped articles arranged above each other in the channels. One lowest rod-shaped article of a single file next to each other may then be pushed out of its channel by the pusher device. This may for example be done by moving the pusher device from one channel to the next channel of the reservoir or by moving the conveyor band such that a seat in the conveyor band corresponds to the position of a channel of the rod-shaped article in one channel, respectively. Preferably, the pusher device is designed such that all lowermost rod-shaped articles in the plurality of channels are pushed out of their respective channel simultaneously. By this, a plurality of rod-shaped articles may be transferred by a single, preferably linear movement, out of the reservoir. Accordingly, the conveyor band is provided with a plurality of seats for receiving the plurality of rod-shaped articles from the plurality of channels.

Preferably, the conveyor band comprises a plurality of seats. Preferably, the seats of the plurality of seats are arranged equidistantly and in a parallel manner. Preferably, seats are arranged along the entire conveyor band. Providing a plurality of seats in the conveyor band allows a continuous transport of a plurality of rod-shaped articles. By this, the system according to the invention may be adapted for the use in mass production where the transfer of rod-shaped articles is required.

In combination with a reservoir comprising a plurality of channels for rod-shaped articles, a plurality of rod-shaped articles may directly be pushed into a plurality of seats arranged in the conveyor band. Preferably the arrangement of the seats in the conveyor band corresponds to the arrangement of the channels in the reservoir.

According to an aspect of the system according to the invention, the conveyor band is a closed-loop conveyor. Closed-loop conveyors are preferred conveyors in transport processes and require low maintenance. In addition, in a closed-loop conveyor portions with different speeds as well as a speed compensation may be integrated into the same conveyor. Only one speed compensator may be provided to compensate a speed variation. No additional speed compensation conveyors may be required.

According to another aspect of the system according to the invention, the speed compensator comprises two movable compensation wheels transporting the conveyor band. Preferably, the conveyor band is guided around the compensation wheels, such that the conveyor band forms loops. Preferably, a loop has an opening angle of between <180 degree and 0 degree (wherein 180 degree opening angle of the loop corresponds to the guiding of the conveyor band in a straight line; 0 degree opening angle of the loop corresponds to a turn of the conveyor band of 180 degree when being guided around the compensation wheel). More preferably, the opening angle of the loop is in a range between 90 degree and 0 degree.

Preferably, the two compensation wheels are movable in a same direction. Preferably, the wheels are interconnected such as to perform a correlated movement of the two compensation wheels. More preferably, the wheels are interconnected such as to be arranged at a constant distance and such as to move synchronously, preferably in a same direction. By guiding the conveyor band with moveable conveyor wheels, the length of the conveyor band in a certain location or the size of a loop of a conveyor band may be varied. By varying the size of one loop with one compensation wheel, the speed of a portion of the conveyor band may be varied. By moving a second compensation wheel and thereby varying the size of another loop of the conveyor band the speed of another portion of the conveyor band may be varied. By interconnecting the two compensation wheels, the speed variations of the two portions of the conveyor band may be correlated. If the two wheels are fixed to each other at a constant distance, a synchronous, parallel movement of the two compensation wheels may be realized. Such a compensation wheel arrangement is especially favorable when using a closed loop conveyor. Therein, the correlated movement of the wheels and the continuous construction of the closed-loop conveyor may synchronize any speed variations in the conveyor band. Preferably, upon moving the two compensation wheels in a same direction and along a same distance, the length of one loop of the conveyor band is shortened while the length of the second loop is enlarged, and vice versa. By this, the portion of the conveyor band following the shortened loop may be slowed down or even stopped, while the portion following the enlarged loop may be accelerated or kept at a constant speed.

Thus, the speed of the movement of the compensation wheels is adapted to a desired speed variation or compensation of a portion of the conveyor band.

Preferably, the rod-shaped article is retained in the seat of the conveyor band. This may for example be done by providing the seat with a certain clamping force. A clamping force has to be adapted in order not to damage the rod-shaped article and to be released to leave the rod-shaped article out of its seat at a transfer location. Well-known retaining means in the manufacture and handling of rod-shaped articles for smoking articles is the provision of suction to a seat, where rod-shaped articles are to be temporarily held in. In the present invention, suction is preferably applied to the conveyor band and distributed to the seat or the plurality of seats arranged in the conveyor band. If no retaining force is required any more, suction may be interrupted or stopped. In some preferred embodiments of the system according to the invention, the system comprises an arrangement for retaining rod-shaped articles in a conveyor band according to the invention comprising an offset conveyor band and as described further below. Different retaining means may also be combined or for example applied to different portions of the conveyor band.

According to another aspect of the invention there is provided a method for transferring rod-shaped articles. The method comprises the steps of providing a rod-shaped article in a reservoir, arranging a conveyor band adjacent to the reservoir and transferring the rod-shaped article from the reservoir to the conveyor band. Further steps of the method are varying a speed of a portion of the conveyor band and compensating the speed variation of the portion of the conveyor band, thereby keeping constant a speed of another portion of the conveyor band.

Preferably, the reservoir holds a plurality of rod-shaped articles and preferably a plurality of rod-shaped articles are transferred to the conveyor belt synchronously.

According to some embodiments, the step of compensating said speed variation is performed by varying the size of at least one loop in the conveyor band.

According to another aspect of the method for transferring rod-shaped articles according to the invention, the method further comprises the step of stopping a portion of the conveyor band while transferring the rod-shaped article from the reservoir to the stopped portion of the conveyor band. Preferably, the method for transferring further comprises the step of transferring the rod-shaped article from the conveyor band to a receiving conveyor, for example a cutting drum, thereby keeping constant the speed of the conveyor band at a transfer location to the receiving conveyor.

Advantages and further aspects of the method have been described above referring to the system according to the invention and will therefore not be repeated.

According to another aspect of the invention, there is provided an arrangement for retaining rod-shaped articles in a conveyor band. Preferably, the arrangement is for use in a system for transferring rod-shaped articles, for example such as the system according to the invention and as described herein. The arrangement comprises a conveyor band comprising at least one seat adapted to receive a rod-shaped article in the seat. The arrangement further comprises a conveyor wheel, wherein the at least one seat is guidable in the conveyor band around the conveyor wheel. An offset conveyor band is arranged in parallel and at a distance to the conveyor band along a section of the conveyor band. Therein the distance is adapted such that the offset conveyor band is to contact a rod-shaped article in the seat of the conveyor band along the section of the conveyor band, wherein the section of the conveyor band comprises at least the part of the conveyor band that is being guided around the conveyor wheel.

A retaining of rod-shaped articles in a conveyor band may be required if a conveyor band is moved in a tilted or turned upside-down manner or is being tilted or turned upside down upon being moved. Especially, if a conveyor band is guided around conveyor wheels, rod-shaped articles may fall off the conveyor band. In order for the rod-shaped articles in the conveyor band not to fall off inadvertently, the offset conveyor band is preferably arranged in those sections of the conveyor band that are intended to comprise one or a plurality of rod-shaped articles and that is tilted, turned upside down or moved in an upside-down manner. In sections of the conveyor band, where no rod-shaped articles are present, for example at a location where rod-shaped articles are released from the conveyor band, sections after such a release and before loading or reloading the conveyor band, an offset conveyor band may be omitted. The parallel guiding of the conveyor band and offset conveyor band provides a secure path for the rod-shaped article to be moved along, however with limited mobility. By the offset conveyor band the rod-shaped article may be held in the seat without any gripping or clamping forces exerted by or through the seat onto the rod-shaped article that might damage soft or brittle rod-shaped articles.

Preferably, conveyor band and offset conveyor band are synchronously guided at least along that part where they are arranged in parallel. A synchronous guiding prevents a relative movement between conveyor band and offset conveyor band. Thereby, a rotation or shear of the rod-shaped article in the seat contacted by the conveyor band and the offset conveyor band may be prevented. This additionally supports a safe and smooth transfer of the rod-shaped article with a conveyor band.

Preferably, the conveyor band is guided around the conveyor wheel, such that the conveyor band forms a loop. Preferably, a loop has an opening angle of between <180 degree and 0 degree (wherein 180 degree opening angle of the loop corresponds to the guiding of the conveyor band in a straight line; 0 degree opening angle of the loop corresponds to a turn of the conveyor band of 180 degree when being guided around the compensation wheel). More preferably, the opening angle of the loop is in a range between 90 degree and 0 degree.

Retaining means comprising an offset conveyor band may also be combined with other retaining means, for example with suction means applied to the conveyor band or parts of the conveyor band as already described above with reference to the system according to the invention.

According to an aspect of the arrangement according to the invention, conveyor band and offset conveyor band are closed-loop conveyors. Next to general advantages of the use of closed-loop conveyors, the design of conveyor band and offset conveyor band as closed-loop conveyors provides additional advantages. If both conveyor bands are designed as closed-loop conveyors a synchronous and also a parallel transporting and guiding of conveyor band and offset conveyor band is facilitated. For example both conveyors may be guided by the same conveyor wheels.

In some preferred embodiments, the arrangement comprises a plurality of conveyor wheels, wherein the conveyor band is guidable around the plurality of conveyor wheels. Therein, the offset conveyor band is arranged in parallel to the conveyor band preferably along the part of the conveyor band that is guided around at least two of the conveyor wheels.

According to another aspect of the arrangement according to the invention, the offset conveyor band comprises or is one or a combination of a band of cloth, a metal tape and a structured band comprising structures for interacting with a rod-shaped article arranged in a seat of the conveyor band. Preferably, the offset conveyor band is constructed in a light manner, for example made of one or several light-weight materials or has a light structure. Preferably, the offset conveyor is constructed in order to allow a soft but secure retaining of the rod-shaped articles in the conveyor band when said conveyor band is arranged in parallel to the offset conveyor band.

In some preferred embodiments of the arrangement according to the invention, at least one of the conveyor band and the offset conveyor band are constructed as a double-banded conveyor. Preferably, the two bands of the double-banded conveyor are guidable in parallel. The provision of double-banded conveyors allows a secure support or a retaining, respectively, of rod-shaped articles using less material for the conveyors. For example double-banded conveyors may provide a support or a retaining of the rod-shaped articles at two different locations. The two different locations are preferably the two end regions of the rod-shaped article. In addition, by constructing a conveyor band as a double banded conveyor, an offset conveyor—as one band or double-banded offset conveyor—may for example be arranged in between the two bands of the conveyor band. Thus a space saving, compact arrangement may be constructed. In a double-banded conveyor, a seat for a rod-shaped article is preferably divided into two parts, one part on each of the two bands of the double-banded conveyor.

According to another aspect of the arrangement according to the invention, the conveyor band is a chain conveyor and the conveyor wheel is a toothed wheel. Chain conveyors in combination with toothed wheels are reliable conveyors with high constancy and low maintenance. If the conveyor band is constructed as a double-banded conveyor, the two bands may be guided by two toothed wheels connected by a shaft. The two bands may then each have a width substantially corresponding to the width of the toothed wheels.

According to another aspect of the arrangement according to the invention, the arrangement further comprises a speed compensator for compensating a speed variation of a portion of the conveyor band such that a speed of another portion of the conveyor band remains constant.

The aspects and advantages of a speed compensator have been described relating to the system according to the invention and will therefore not be repeated.

An offset conveyor band is arranged parallel to and along the section of the conveyor band that is guided around a conveyor wheel in order to support a retaining of the rod-shaped articles in the conveyor band. A conveyor wheel may be a compensation wheel of a speed compensator. Therefore, if the speed of a portion of the conveyor band is varied, also the speed of the offset conveyor band along this portion has to be varied if offset conveyor and conveyor band are to be moved synchronously at least along said section.

Preferably, an offset conveyor band is not arranged parallel to the entire conveyor band. Especially, an offset conveyor band is not required before rod-shaped articles have been transferred onto the conveyor band. If the conveyor band is slowed down or stopped for such a transfer, no speed compensation is required for the offset conveyor band in that portion. However, if an offset conveyor band is arranged in portions where the speed variation of another portion has to be varied, then the arrangement also comprises a speed compensator for compensating a speed variation of a portion of the offset conveyor band such that a speed of another portion of the offset conveyor band remains constant. Preferably, only one speed compensator is provided for both, the conveyor band and for the offset conveyor band.

Preferably, the arrangement according to the invention is combined with a system for transferring rod-shaped articles in a conveyor band such as for example the system according to the invention and as described herein.

According to another aspect of the invention, there is provided a method for retaining rod-shaped articles in a conveyor band. The method comprises the steps of providing a rod-shaped article in a conveyor band, arranging an offset conveyor band at a distance and parallel to the conveyor band thereby contacting the rod-shaped article in the conveyor band with the offset conveyor band while guiding the rod-shaped article in the conveyor band around a conveyor wheel. Preferably, the rod-shaped article is provided in a seat arranged in the conveyor band. Preferably, a series of rod-shaped articles is provided in the conveyor band. The rod-shaped article or articles may be transferred from a reservoir to the conveyor band. The reservoir may for example be a reservoir comprising one or more channels, wherein rod-shaped articles are arranged in single files as described above referring to the system according to the invention. Preferably, the conveyor band and the offset conveyor band are guided in a substantially 180 degree loop around the conveyor wheel.

According to an aspect of the method for retaining rod-shaped articles according to the invention, the method further comprises the step of synchronously guiding the conveyor band and the offset conveyor band at least around the conveyor wheel.

Advantages and further aspects of the method for retaining rod-shaped articles have been described with reference to the arrangement or to the system according to the invention and are therefore not repeated.

The system and arrangement according to the invention, as well as the method for transferring rod-shaped articles and the method for retaining rod-shaped articles in a conveyor band are preferably used in the production of smoking articles, including smoking articles comprising combustible heat sources and aerosol-forming substrates comprising tobacco. Preferably, the rod-shaped articles are elements used for smoking articles, such as tobacco rods, paper or plastic tubes, heat sources, aerosol-forming substrates or rod-shaped articles comprising one or several of such elements.

The invention is further described with regard to embodiments, which are illustrated by means of the following drawings, wherein.

Figure 1:
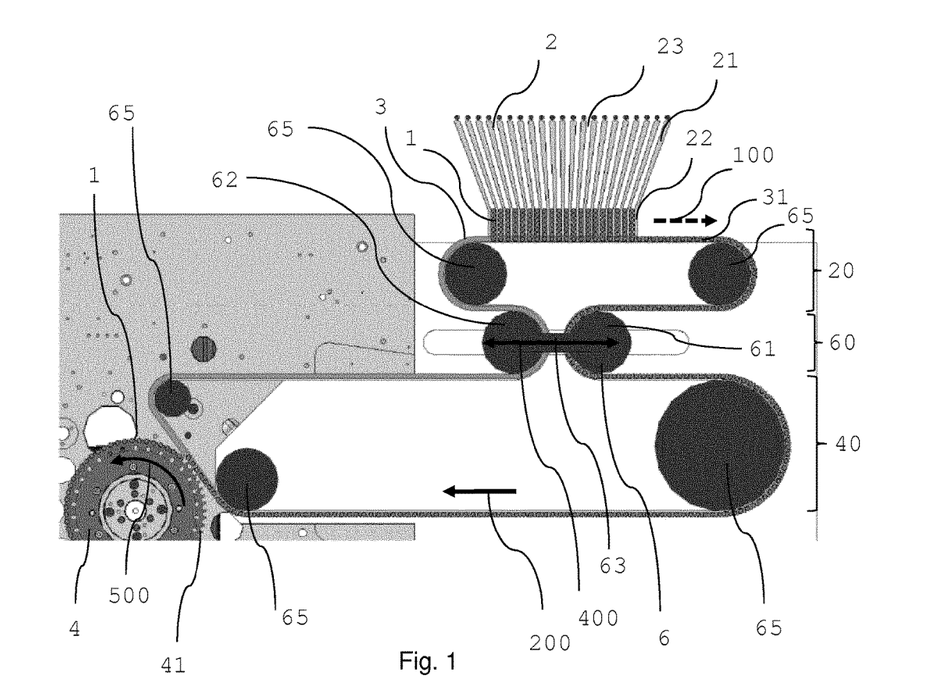
FIG. 1 shows a view of a system for transferring rod-shaped articles according to the invention.
Figure 2:
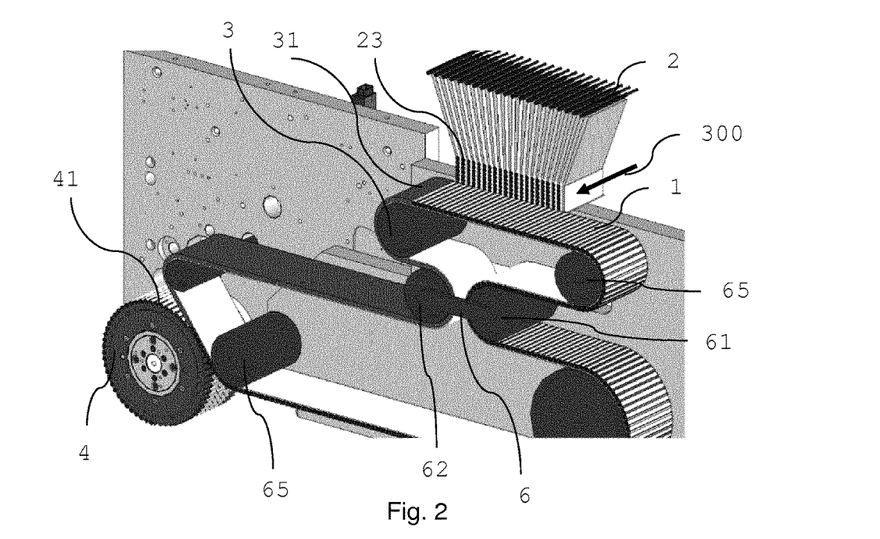
FIG. 2 is a perspective view onto the system according to FIG. 1.

In the system as shown in FIG. 1 and FIG. 2 rod-shaped articles 1 are supplied to a reservoir, for example a hopper 2, and from there to a conveyor band 3. The conveyor band 3 comprises a plurality of grooves 31 arranged in parallel. The rod-shaped articles 1 are transported in the grooves 31 to a receiving conveyor, such as for example a cutting drum 4, for example a cutting drum of a filter combiner machine. The conveyor band 3 is an endless belt and is guided and led over several conveyor wheels 65 and over a speed compensator 6. The speed compensator 6 comprises two compensation wheel 61,62, which are mechanically coupled by a bar 63, such as to be linearly movable together.

Tobacco rods 1 are delivered to the hopper 2, for example by means of a conveyor (not shown). In the hopper 2 the tobacco rods 1 are guided downwards along a plurality of channels 23 arranged in the hopper. In an upper part 21 of the hopper 2, the sides and channels 23 of the hopper are converging versus a lower part 22 of the hopper. In the lower part 22 of the hopper 2, the plurality of channels 23 are arranged parallel to each other. The tobacco rods in the lower part 22 form lines in a top-down direction. Preferably, the width of the channels 23 is slightly larger than the diameter of the rods 1. A length of the channels 23 or the width the hopper 2, respectively, advantageously corresponds to the length of the tobacco rods. Behind the channels of the hopper a plunger (not shown) is arranged such as to be able to push the lowest single layer of tobacco rods from the channels into the grooves 31 of the conveyor band 3. The pushing direction is indicated by arrow 300. The lowest tobacco rod 1 of each channel 23 is pushed separately into an appropriate groove 31 of the conveyor band 3. The hopper 4 is arranged adjacent a length side of the conveyor band 3. The hopper 4 is arranged such that the level of the lowest single layer is aligned and in-line with the grooves 4 in the conveyor band 3.

The conveyor band may be a rubber band or a band of suitable material.

The upper part of the system or of the conveyor band describes the supply section 20 of the conveyor band 1. The supply section 20 operates on a start-stop principle, which is indicated by arrow 100. The supply section 20 is stopped for the supply of tobacco rods 1 into the grooves 31 of the conveyor band 3, that is, for the pushing action of the plunger to push the lowest layer of tobacco rods onto the conveyor band.

That part of the conveyor band 3, where tobacco rods are transferred from the grooves 31 of the conveyor band 3 into grooves 41 of the cutting drum 4 is the cutting drum section 40. The cutting drum section 40 of the conveyor band 3 moves at a constant linear speed, indicated by arrow 200. This linear speed corresponds to the peripheral speed of the cutting drum 4 (indicated by arrow 500). The cutting drum section 40 of the conveyor band operates on a constant speed principle, while the supply section 20 operates on a start-stop principle. In order to enable operating of the conveyor band 3, speed compensator 6 is provided in the compensation section 60, which is arranged between upper supply section 20 and lower cutting drum section 40. In the speed compensator 6, the conveyor band 3 is wound around two compensating wheels 61,62. The two compensating wheels 61,62 are movable in a linear direction, which movement is to the left and to the right as indicated by double arrow 400 in FIG. 1 and FIG. 2. In the example as shown in the drawings, the supply section 20 of the conveyor band is stopped when the plunger pushes the tobacco rods 1 onto the supply section 20 of the conveyor band 3. At the same time, the compensating wheels 61,62 move to the right. Due to this movement of the compensating wheel 61 conveyor band from the compensation section 60 is continuously moved on to the cutting drum section 40. At the same time conveyor band 3 leaving the cutting drum section 40 after having transferred the tobacco rods 1 from the conveyor band to the cutting drum 4 in the cutting drum section, is continuously further transported. Since the conveyor band 3 is stopped for the pushing action, no conveyor band can be moved to the hopper section 20. This conveyor band portion is compensated by the compensation wheel 62 also moving to the right. Thus, when the hopper section 20 of the conveyor band 3 is stopped, the cutting drum section 40 of the conveyor band 3 may run at the speed of the cutting drum 4, and especially at a constant speed.

After tobacco rods 1 have been pushed into the grooves 4 of the conveyor band 3 the hopper section 20 of the conveyor band 3 starts moving (arrow 100) and the compensating wheels 61,62 move to the left in FIGS. 1 and 2. The operation of the compensating wheels 61,62 and the conveyor band 3 substantially perform the operation of a small capacity buffer. A capacity of the buffer corresponds to the number of tobacco rods 1 in one layer pushed from the channels 23 to the conveyor band 3. The compensation cycle is repeated continuously such that a continuous supply of tobacco rods 1 to the cutting drum 4 may be provided.

Figure 3:
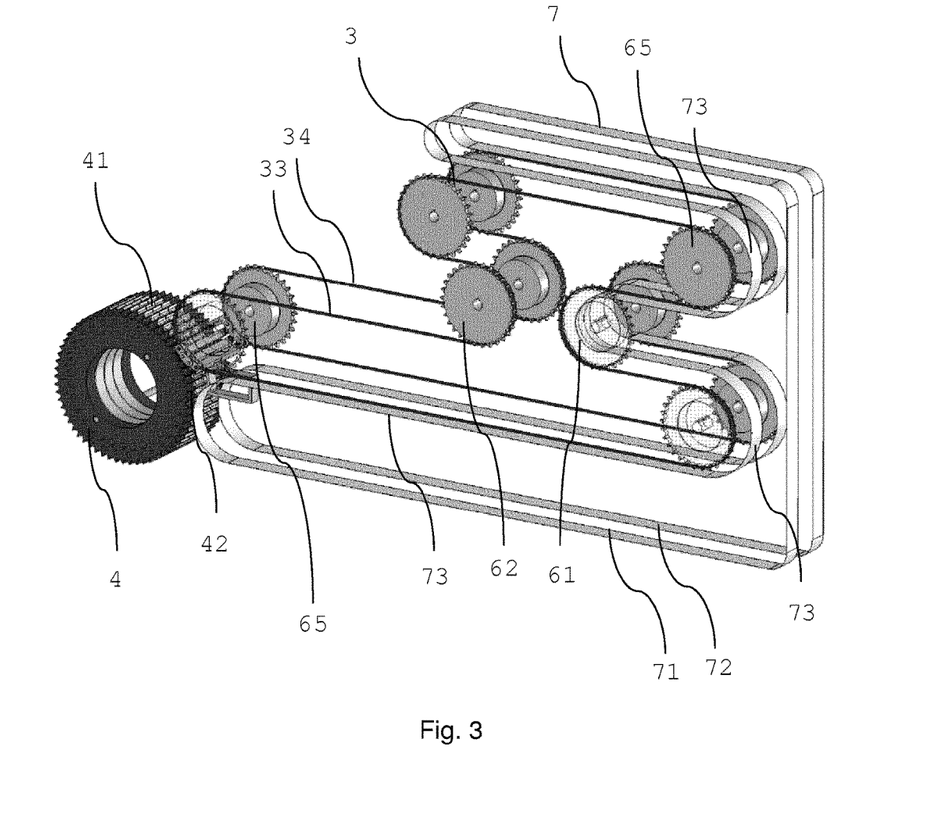
FIG. 3 schematically shows an arrangement for retaining rod-shaped articles in a conveyor band.

In FIG. 3 an embodiment of a system for transferring rod-shaped articles and an arrangement for retaining rod-shaped articles in the conveyor band of this system are shown. Identical reference numerals are used for the same or similar elements of FIGS. 1 and 2.

The conveyor band 3 is a chain conveyor comprising two chains 33,34 arranged and guided in parallel. Grooves (not shown) for transferring the rod-shaped articles, such as tobacco rods, are formed in the chains 33,34 of the chain conveyor such that a rod-shaped article comes to lie in a corresponding groove on each of the chains 33,34. The depth of the grooves is preferably substantially equal to the radius of the tobacco rods. The tobacco rods are not gripped in their grooves but are held therein by means of an additional conveyor band 7. The additional conveyor band is arranged offset from the chain conveyor 3. Preferably, the distance between offset conveyor band 7 and chain conveyor 3 is chosen such that the offset conveyor touches the rod-shaped articles in the grooves of the chain conveyor such that a rod-shaped article is held in its respective groove by the offset conveyor 7. The offset conveyor may also provide a certain retaining force onto the rod-shaped articles to guarantee that a rod-shaped article is pushed into its respective groove by this certain force. The offset conveyor comprises two bands 71,72 arranged offset from the trajectory of the transferred tobacco rods. By the offset conveyor 7, the tobacco rods do not fall out of the grooves and are gently held between chain conveyor and offset conveyor while being transported. Preferably, the offset conveyor band 7 moves synchronously with the chain conveyor 3 to reduce friction between tobacco rods in the grooves and the offset conveyor band 7. Preferably, the material of the offset conveyor is cloth or a thin metal tape. The material of the bands 71,72 may be chosen according to a surface material of the rod-shaped article to be retained in the conveyor band 3.

The offset conveyor 7 is basically only arranged in those regions of the system, where tobacco rods are present in the chain conveyor 3. No offset conveyor is required in the region of the system, where tobacco rods have been transferred to the cutting drum 4 and before new tobacco rods are transferred to the chain conveyor 3 from a reservoir (not shown). The reservoir may be arranged in the uppermost section of the system similar to FIG. 1 and FIG. 2. As can be seen in FIG. 3, at the transfer location 42 the offset conveyor 7 is not further guided in parallel to the conveyor band 3 but turns downwards and returns back and to the uppermost part of the system. Thus, the rod-shaped articles in the grooves of the chain conveyor may be transferred into the grooves 41 of the cutting drum 4 at the transfer location 42. The conveyor band is then further guided around conveyor wheels 65 to the uppermost part where rod-shaped articles may be supplied to the conveyor band 3 again.

In the uppermost part of the system, rod-shaped articles may be pushed sideways into the grooves of the chains 33,34 from the reservoir. The bands 71,72 of the offset conveyor 7 start to be guided parallel and offset from the chain conveyor 3 in this uppermost part of the system. By this, rod-shaped articles are held in the grooves from the time when being supplied to the conveyor band 3. The retaining action of the offset bands 71 72 may also have an alignment function should a rod-shaped article not be exactly positioned in a groove. In a variant, the offset conveyor 7 is arranged after supply of rod-shaped articles to the conveyor band 3, for example in the top-right corner of the system of FIG. 3.

Chain conveyor and offset conveyor are both closed-loop conveyors. The conveyor wheels 65 are toothed wheels for guiding the two chains 33,34 of the chain conveyor. Parallel conveyor wheels are connected by a shaft. The shaft also supports the two bands 71,72 of the offset conveyor 7 when the bands 71,72 are not guided to retain the rod-shaped articles around an outer periphery of a conveyor wheel but to retain the rod-shaped articles, when the conveyor band is guided around the conveyor wheel with the grooves directing to the shaft (see compensation wheel 61).

The distance of the wheels, a width of chains 33,34, a width of offset conveyor bands 71,72 or a combination thereof may be adapted to a length of rod-shaped articles. The two offset band 71,72 may for example also be replaced by one single band preferably arranged centrally between the two chains 33,34.

The transfer system of FIG. 3 is also provided with a speed compensator and compensation wheels 61,62. The offset conveyor bands 71,72 are guided around one compensation wheel following the supply section in order to move synchronously with the conveyor band 3 in this part of the system. If compensation of the offset conveyor shall be provided, this is preferably done remote from compensation wheel 62, for example by a separate compensation wheel. The offset conveyor 7 may be provided with further conveyor wheels to guide the offset conveyor only in that part of the system, where rod-shaped articles are provided in the chain conveyor (right side of the system in FIG. 3).

The invention claimed is:

1. System for transferring rod-shaped articles, the system comprising
   a reservoir for holding a plurality of rod-shaped articles;
   a conveyor band comprising a seat adapted to receive a rod-shaped article from the reservoir, the seat being a groove arranged in the conveyor band, the reservoir being arranged along a length side of the conveyor band;
   a speed compensator actively compensating a speed variation of a portion of the conveyor band such that a speed of another portion of the conveyor band is kept constant.

2. System according to claim 1, further comprising a pusher device, wherein the seat is arranged in the conveyor band such that a rod-shaped article is pushable from the reservoir into the seat of the conveyor band by the pusher device.

3. System according to claim 1, wherein the reservoir further comprises a channel adapted to hold a single file of rod-shaped articles arranged above each other in the channel.

4. System according to claim 1, wherein the conveyor band is a closed-loop conveyor.

5. System according to claim 1, wherein the speed compensator comprises two movable compensation wheels transporting the conveyor band.

6. Method for transferring rod-shaped articles, the method comprising the steps of:
   providing a rod-shaped article in a reservoir;
   arranging the reservoir along a length side of a conveyor band;
   transferring the rod-shaped article from the reservoir to a seat on the conveyor band, the seat being a groove arranged in the conveyor band;
   varying a speed of a portion of the conveyor band and compensating actively the speed variation of the portion of the conveyor band, thereby keeping constant a speed of another portion of the conveyor band.

7. Method according to claim 6, wherein the step of compensating said speed variation is performed by varying the size of at least one loop in the conveyor band.

8. Method according to claim 6, further comprising the step of stopping a portion of the conveyor band while transferring the rod-shaped article from the reservoir to the stopped portion of the conveyor band.

9. Method according to claim 6, further comprising the step of transferring the rod-shaped article from the conveyor band to a receiving conveyor, thereby keeping constant the speed of the conveyor band at a transfer location to the receiving conveyor.

10. Arrangement for retaining rod-shaped articles in a conveyor band, the arrangement comprising
    a conveyor band comprising at least one seat adapted to receive a rod-shaped article, the seat being a groove arranged in the conveyor band;
    a conveyor wheel, wherein the at least one seat is guidable in the conveyor band around the conveyor wheel;
    an offset conveyor band arranged in parallel and at a distance to the conveyor band along a section of the conveyor band,
    wherein the distance is adapted such that the offset conveyor band is to contact a rod-shaped article in the seat of the conveyor band along the section of the conveyor band, and wherein the section of the conveyor band comprises at least the part of the conveyor band that is being guided around the conveyor wheel.

11. Arrangement according to claim 10, wherein conveyor band and offset conveyor band are closed-loop conveyors.

12. Arrangement according to claim 10, wherein the offset conveyor band comprises or is one or a combination of a band of cloth, a metal tape and a structured band comprising structures for interacting with a rod-shaped article arranged in a seat of the conveyor band.

13. Arrangement according to claim 10, wherein at least one of the conveyor band and the offset conveyor band are constructed as a double-banded conveyor.

14. Arrangement according to claim 10, further comprising a speed compensator configured for compensating a speed variation of a portion of the conveyor band such that a speed of another portion of the conveyor band remains constant.

15. Method for retaining rod-shaped articles in a conveyor band, the method comprising the steps of:
    providing a rod-shaped article to a seat in a conveyor band, the seat being a groove arranged in the conveyor band;
    arranging an offset conveyor band at a distance and parallel to the conveyor band thereby contacting the rod-shaped article in the conveyor band with the offset conveyor band while guiding the rod-shaped article in the conveyor band around a conveyor wheel.

16. Method according to claim 15, further comprising the step of synchronously guiding the conveyor band and the offset conveyor band at least around the conveyor wheel.

17. System according to claim 1, comprising an arrangement comprising:
    the conveyor band comprising at least one seat adapted to receive a rod-shaped article;
    a conveyor wheel, wherein the seat is guidable in the conveyor band around the conveyor wheel;
    an offset conveyor band arranged in parallel and at a distance to the conveyor band along a section of the conveyor band,
    wherein the distance is adapted such that the offset conveyor band is to contact a rod-shaped article in the seat of the conveyor band along a section of the conveyor band, and wherein the section of the conveyor band comprises at least the part of the conveyor band that is being guided around the conveyor wheel.

18. System according to claim 2, wherein the reservoir further comprises a channel adapted to hold a single file of rod-shaped articles arranged above each other in the channel.

19. System according to claim 2, wherein the conveyor band is a closed-loop conveyor.

20. System according to claim 18, wherein the conveyor band is a closed-loop conveyor.

\* \* \* \* \*